United States Patent
Mangin

(10) Patent No.: US 12,341,622 B2
(45) Date of Patent: Jun. 24, 2025

(54) METHOD, DEVICE AND SYSTEM FOR TRANSMITTING MESSAGE IN NETWORK

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 17/919,687

(22) PCT Filed: Mar. 4, 2021

(86) PCT No.: PCT/JP2021/009697
§ 371 (c)(1),
(2) Date: Oct. 18, 2022

(87) PCT Pub. No.: WO2021/250960
PCT Pub. Date: Dec. 16, 2021

(65) Prior Publication Data
US 2023/0231732 A1    Jul. 20, 2023

(30) Foreign Application Priority Data
Jun. 10, 2020   (EP) .................................... 20305628

(51) Int. Cl.
*H04L 45/74*   (2022.01)
*H04L 12/18*   (2006.01)

(52) U.S. Cl.
CPC .......... *H04L 12/1859* (2013.01); *H04L 45/74* (2013.01)

(58) Field of Classification Search
None
See application file for complete search history.

(56) References Cited

U.S. PATENT DOCUMENTS 9,106,678 B2 *   8/2015   Elsterer ................... H04L 69/18
2010/0057867 A1  3/2010   Yue et al.
(Continued)

FOREIGN PATENT DOCUMENTS

CN   110943853 A    3/2020
JP   2017-41769 A   2/2017
(Continued)

OTHER PUBLICATIONS

OPC Unified Architecture—Part 14: PubSub Release 1.04 Industry Standard Specification published on Feb. 6, 2018; retreived online on Sep. 6, 2024 from https://opcfoundation.org/developer-tools/documents/view/171 (Year: 2018).*

(Continued)

*Primary Examiner* — Sandarva Khanal
(74) *Attorney, Agent, or Firm* — Birch, Stewart, Kolasch & Birch, LLP

(57) ABSTRACT

In a network having a communication mode involving publisher and subscriber devices over the network, payloads (DataSetMessages) of received messages are extracted and concatenated within a same combined message. Further, a header is added to the combined message, the header comprising a single identifier of a publisher device (PublisherId=k), the publisher identifier being predetermined so as to intend the combined message to at least one chosen subscriber device.

11 Claims, 17 Drawing Sheets

(56) References Cited

U.S. PATENT DOCUMENTS

| | | | | |
|---|---|---|---|---|
| 2012/0233272 | A1 | 9/2012 | Bedi et al. | |
| 2014/0143407 | A1* | 5/2014 | Zhang | H04L 67/535 |
| | | | | 709/224 |
| 2017/0201585 | A1* | 7/2017 | Doraiswamy | H04L 41/0806 |
| 2018/0146060 | A1* | 5/2018 | Foerster | H04L 67/01 |
| 2018/0189303 | A1* | 7/2018 | Mankovskii | G06Q 10/06 |
| 2020/0028791 | A1* | 1/2020 | McGrath | H04L 41/145 |
| 2020/0099762 | A1* | 3/2020 | Eckhardt | G05B 19/4186 |
| 2020/0259896 | A1* | 8/2020 | Sachs | H04W 56/0065 |
| 2020/0396308 | A1* | 12/2020 | Von Hoyningen-Huene | |
| | | | | H04L 67/566 |

FOREIGN PATENT DOCUMENTS

| | | | | |
|---|---|---|---|---|
| WO | WO-2015148816 A1 * | 10/2015 | | G06F 11/00 |
| WO | WO-2017028932 A1 * | 2/2017 | | G05B 19/4185 |
| WO | WO-2019002834 A1 * | 1/2019 | | G06F 16/21 |

OTHER PUBLICATIONS

"IEC 62541-14 EDI: OPC Unified Architecture—Part 14: PubSub," 65E/720/FDIS, International Electrotechnical Commission, IEC, 2020, pp. 1-189.
International Search Report (PCT/ISA/210) issued in PCT/JP2021/009697, dated Apr. 30, 2021.
Written Opinion of the International Searching Authority (PCT/ISA237) issued in PCT/JP2021/009697, dated Apr. 30, 2021.
Taiwanese Office Action and Search Report for Taiwanese Application No. 110119603, dated Mar. 14, 2022, with English translation.
Indian Office Action dated Dec. 28, 2023 for Application No. 202247058728 with an English translation.
"OPC 10000—14: UA Part 14: PubSub," OPC Foundation, Released 1.04, Feb. 6, 2018, https://reference.opcfoundation.org/Core/Part14/v104/docs.
Japanese Office Action for Japanese Application No. 2022-578016, dated Oct. 31, 2023, with English translation.

* cited by examiner

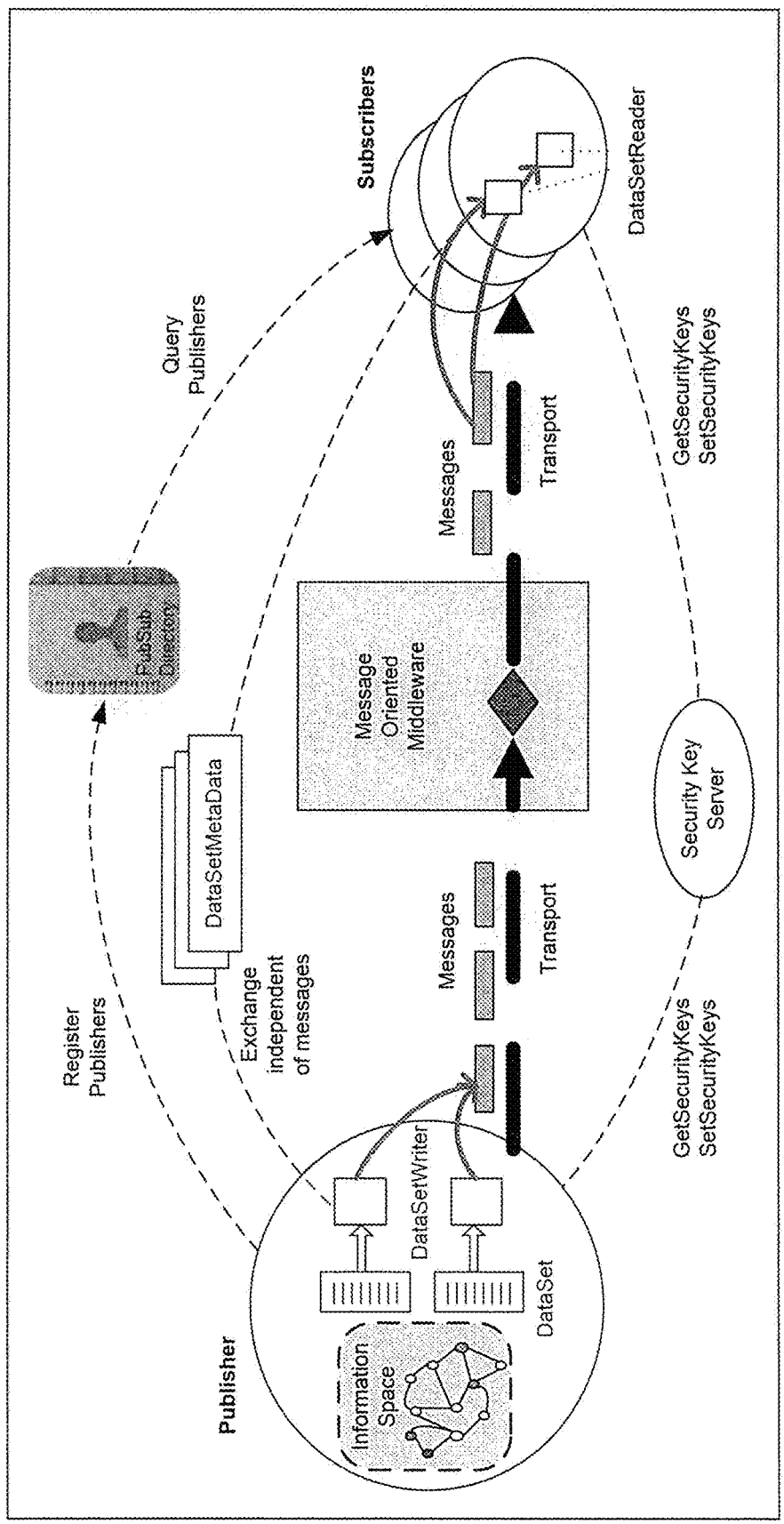
FIG. 1 -Prior Art-

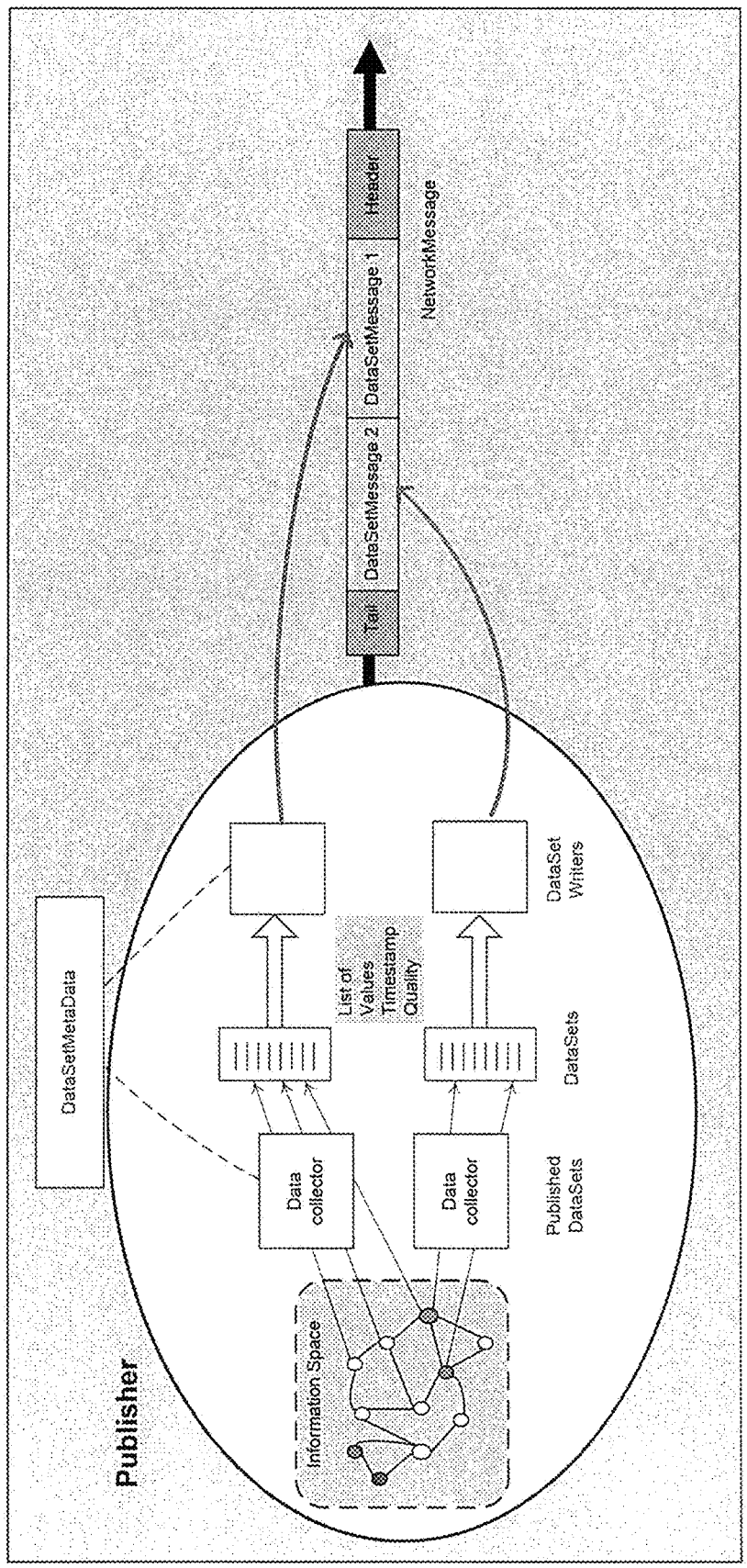
FIG. 2 -Prior Art-

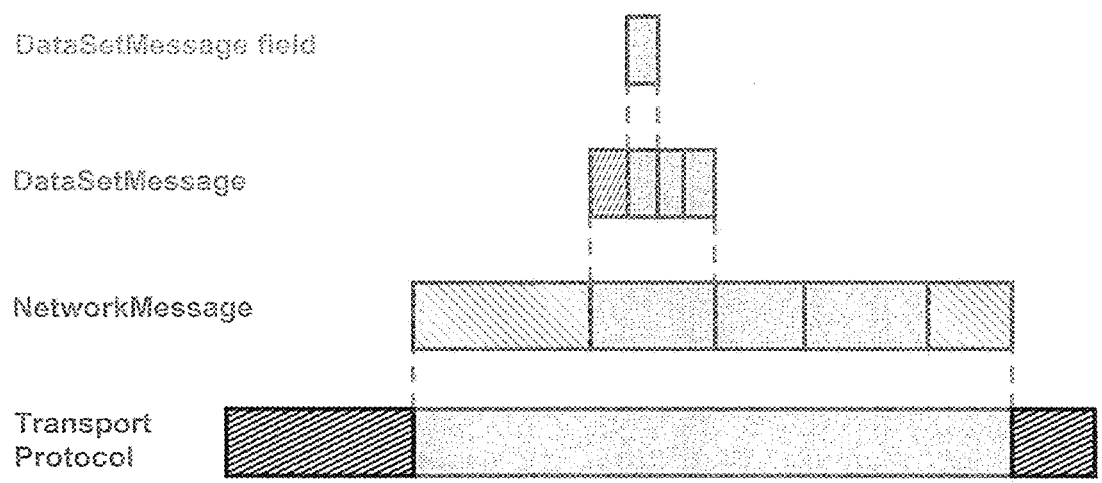
FIG. 3 -Prior Art-

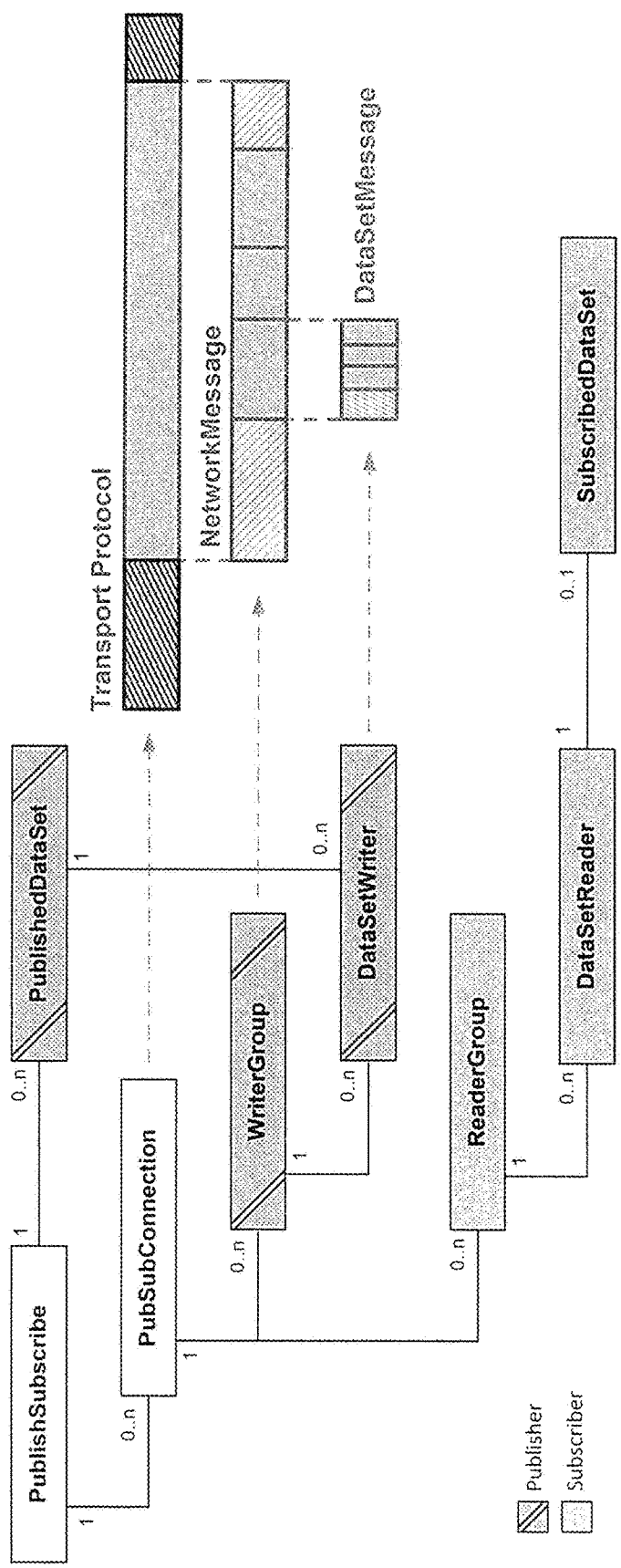
FIG. 4 -Prior Art-

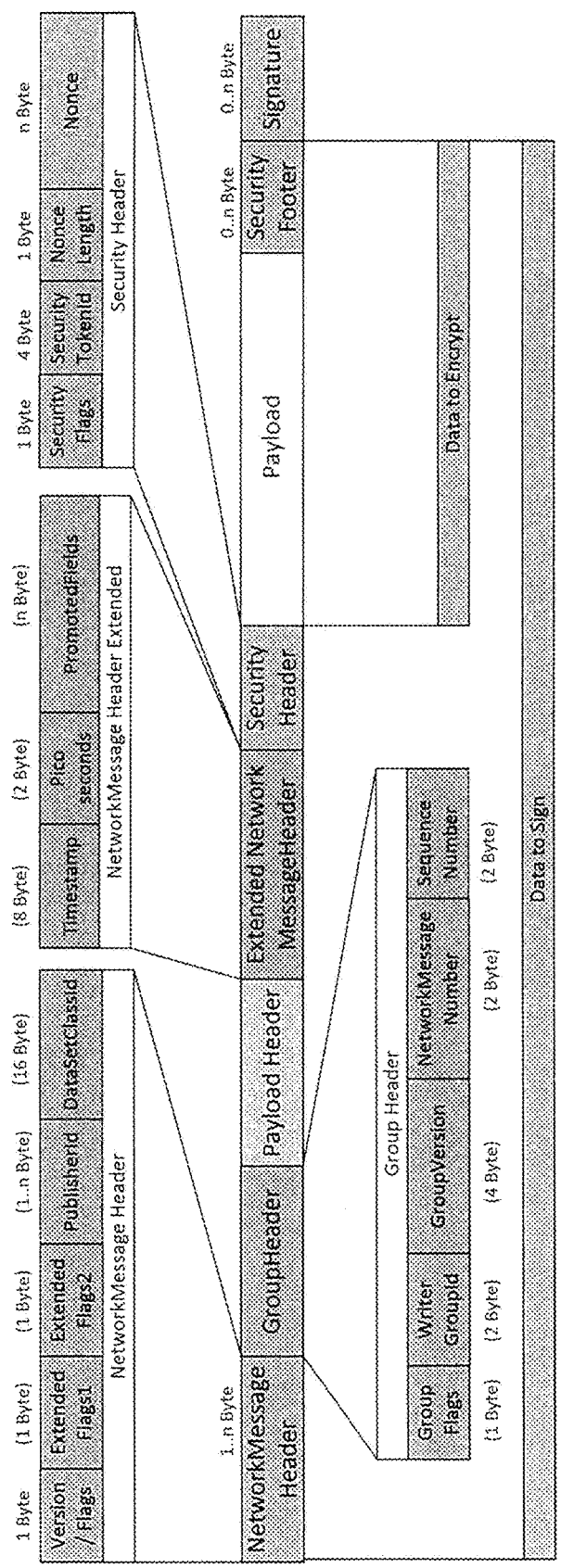
FIG. 5 -Prior Art-

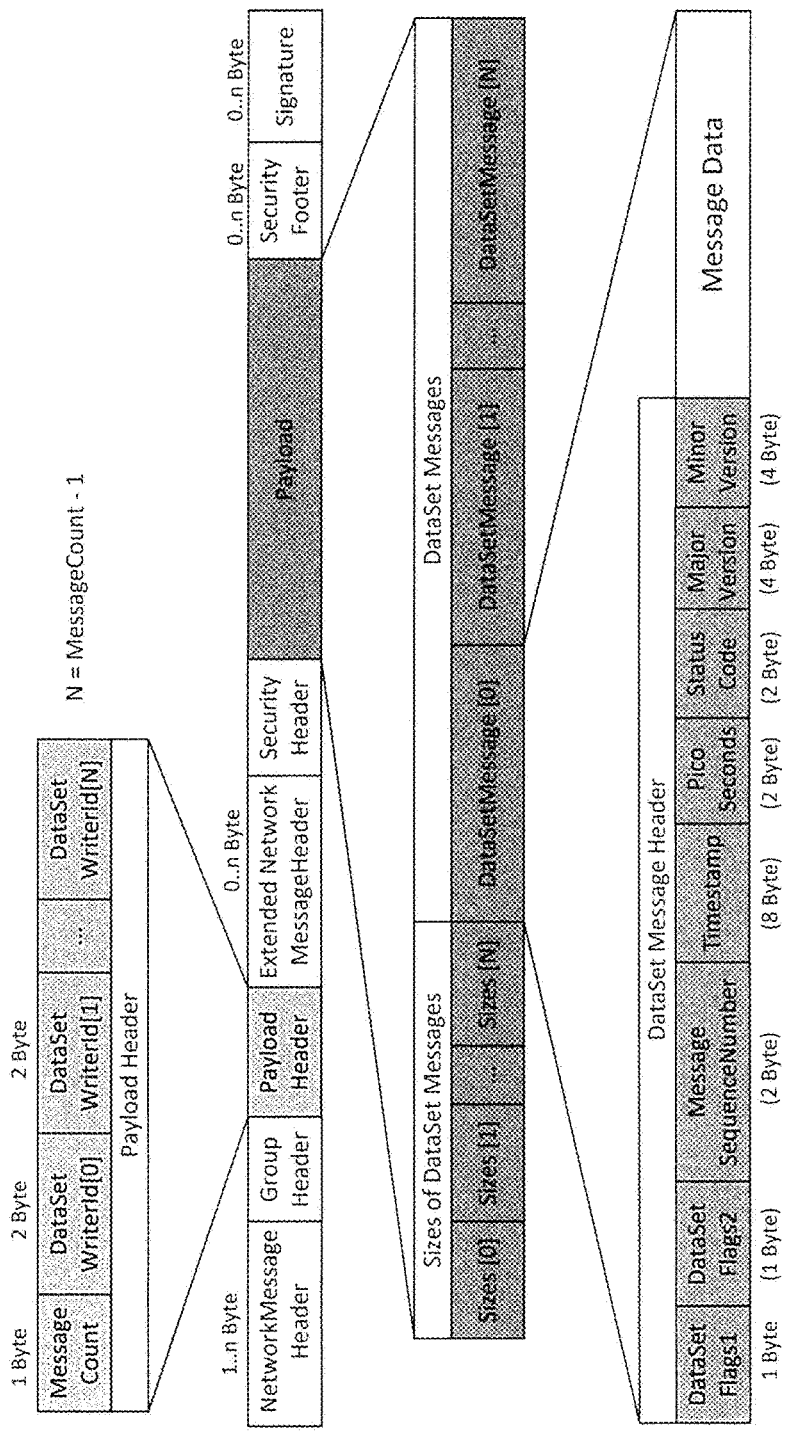
FIG. 6 -Prior Art-

FIG. 7

| 1 Byte | 1 Byte | 2 Byte | 1 Byte | 2 Byte | 4 Byte | 2 Byte | 2 Byte |
|---|---|---|---|---|---|---|---|
| Version / Flags | Extended Flags1 | PublisherId | Group Flags | Writer GroupId | GroupVersion | NetworkMessage Number | Sequence Number |
| NetworkMessage Header | | | Group Header | | | | |

| 1..n DataSetMessages |
|---|
| Payload |

FIG. 8a

| 1 Byte | 1 Byte | 2 Byte | 1 Byte | 2 Byte | 4 Byte | 2 Byte | 2 Byte | 1 Byte | 4 Byte | 1 Byte |
|---|---|---|---|---|---|---|---|---|---|---|
| Version / Flags | Extended Flags1 | PublisherId | Group Flags | Writer GroupId | GroupVersion | NetworkMessage Number | Sequence Number | Security Flags | Security TokenId | Nonce Length |
| NetworkMessage Header | | | Group Header | | | | | Security Header | | |

| DataSetMessages [ ] | 0..n Bytes |
|---|---|
| Payload | Signature |

FIG. 8b

| 1 Byte | 2 Byte | 2 Byte |
|---|---|---|
| DataSet Flags1 | Message SequenceNumber | Status |
| DataSetMessage Header | | |

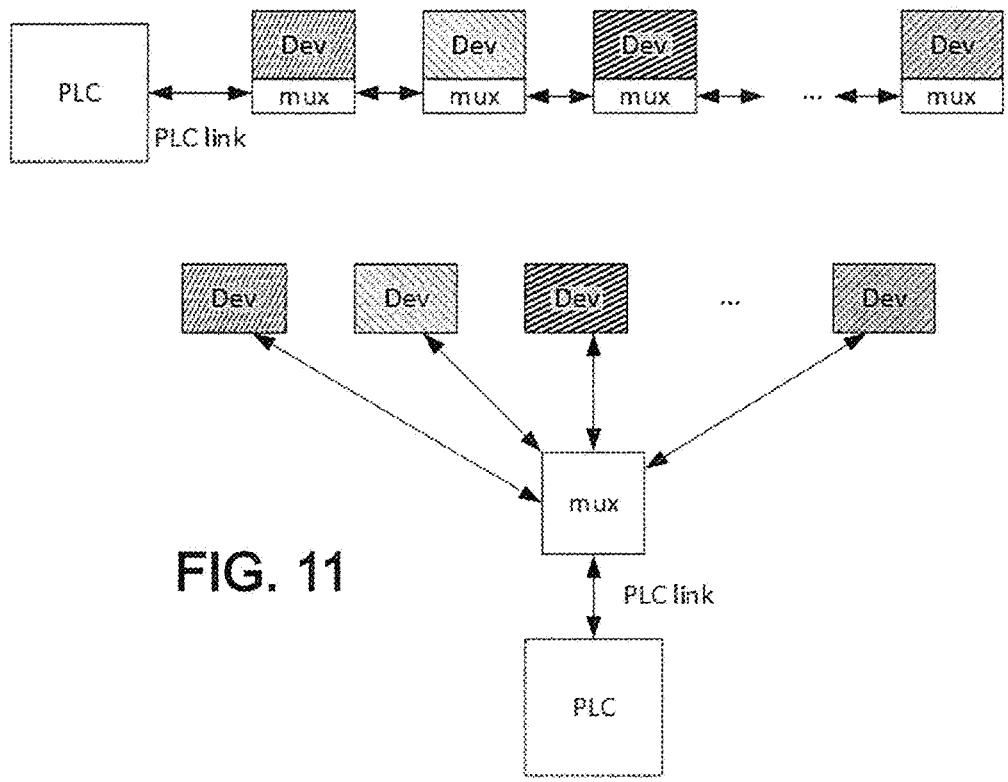
FIG. 11
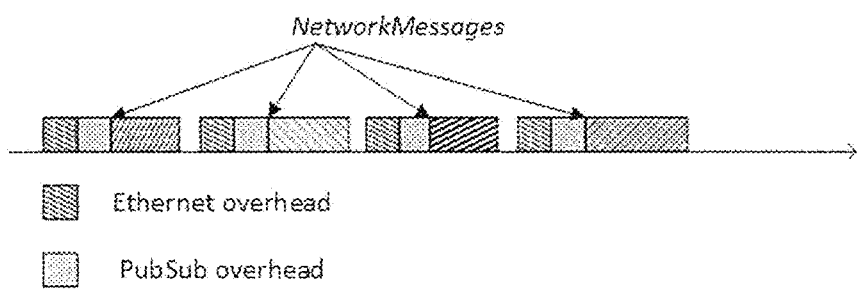
FIG. 12 -Prior Art-
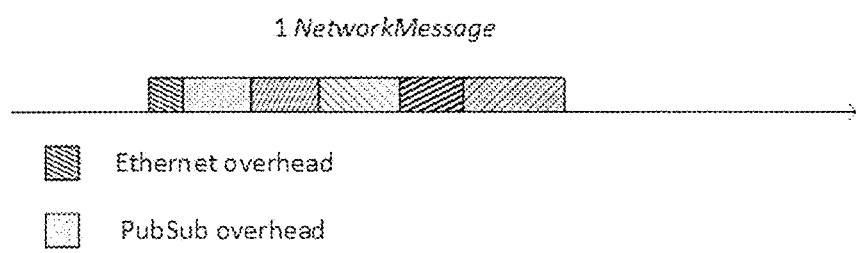
FIG. 13

| Header type | Field | Length (bytes) | Details |
|---|---|---|---|
| NetworkMessage Header | | | |
| | Version / Flags | 1 | |
| | Extended Flags1 | 1 | |
| | Extended Flags2 | 1 | |
| | PublisherId | 2 | Default length |
| | DataSetClassId | 16 | |
| Group Header | | | |
| | Group flags | 1 | |
| | WriterGroupId | 2 | |
| | GroupVersion | 4 | |
| | NetworkMessageNumber | 2 | |
| | SequenceNumber | 2 | |
| Payload Header | | | |
| | MessageCount | 1 | |
| | DataSetWriterId[0] | 2 | |
| | DataSetWriterId[1] | 2 | |
| | ... | | |
| | DataSetWriterId[N] | 2 | N = MessageCount-1 |
| Extended NetworkMessage Header | | | |
| | Timestamp | 8 | |
| | Picoseconds | 2 | |
| | PromotedFields | PF | Depending on configuration |
| Payload: sizes of DataSetMessages | | | For N+1 DataSetMessages |
| | Size[0] | 2 | |
| | Size[1] | 2 | |
| | ... | | |
| | Size[N] | 2 | |
| Payload: DataSetMessages | | | |
| | | PL | Depending on the application |

FIG. 19

| Header type | Field | Length (bytes) | Details |
|---|---|---|---|
| NetworkMessage Header | | | |
| | Version / Flags | 1 | |
| | Extended Flags1 | 1 | |
| | Extended Flags2 | 1 | |
| | PublisherId | 2 | Default length |
| | DataSetClassId | 16 | |
| Group Header | | | |
| | Group flags | 1 | |
| | WriterGroupId | 2 | |
| | GroupVersion | 4 | |
| | NetworkMessageNumber | 2 | |
| | SequenceNumber | 2 | |
| Payload Header | | | |
| | MessageCount | 1 | |
| | DataSetWriterId[0] | 2 | |
| | DataSetWriterId[1] | 2 | |
| | ... | | |
| | DataSetWriterId[N] | 2 | N = MessageCount-1 |
| Extended NetworkMessage Header | | | |
| | Timestamp | 8 | |
| | Picoseconds | 2 | |
| | PromotedFields | PF | Depending on configuration |
| Payload: sizes of DataSetMessages | | | For N+1 DataSetMessages |
| | Size[0] | 2 | |
| | Size[1] | 2 | |
| | ... | | |
| | Size[N] | 2 | |
| Payload: DataSetMessages | | | |
| | | PL | Depending on the application |

FIG. 20

METHOD, DEVICE AND SYSTEM FOR TRANSMITTING MESSAGE IN NETWORK

TECHNICAL FIELD

The present disclosure relates to a method, a device, and a system for transmitting messages in a network having a communication mode involving publisher and subscriber devices over the network.

BACKGROUND ART

Open Platform Communications Unified Architecture (OPC UA) is widely used for flexible best-effort communication in automation, progressively replacing OPC Classic, as well as many vendor-specific protocols. OPC UA is designed to achieve uniform standardized and secure communication across application domains and levels of the automation control hierarchy.

The OPC UA specification has been extended with communications based on the principle of Publish/Subscribe data exchange (hereafter "PubSub"), opening up new usage scenarios, including "many-to-many" communication. In addition, the integration of OPC UA PubSub with Time-Sensitive Networking (TSN) is designed to enable communication with critical real-time requirements.

More details relating to OPC UA are given below. OPC UA is a client-server protocol for industrial communication based on TCP/IP, standardized as IEC 62541. An OPC UA server provides access to data and functionality structured in an object-oriented information model. Clients interact with the information model using a set of standardized services. Each service defines a request and a response message for the interaction. However, a subscription mechanism can also be used to push notifications only when they occur.

More details relating to so-called "Time Sensitive Networking (TSN)" are given below. Within the IEEE 802.1 standards series, enhancements of Ethernet for real time communications, initially developed as Audio Video Bridging (AVB), have been recently extended as Time-Sensitive Networking (TSN). The clock synchronization scheme specified in IEEE 802.1AS and the reservation of transfer capacity via time slots of IEEE 802.1Qbv are the basis standards used in automation networks with real time constraints.

Industrial communications traffic types have been defined to meet the different common use cases found in industrial applications, including their relation to the TSN standards. The introduction of TSN in industrial communication, besides providing the benefits of being an open standard framework, brings also some technical and performance improvements:

potentially higher throughput,
flexibility in mixing connections with differentiated and guaranteed quality-of-service over multiple hops in a bridged network,
economies of scale of a widespread technology intended at both industrial use-cases and consumer devices.

The mechanism "Publish/Subscribe" in OPC UA lets many subscribers register for a topic where published messages are forwarded to all subscribers of the message's topic. This feature allows many subscribers to receive the same message, in a manner similar to the communication schemes implemented in legacy fieldbuses. The content of the published messages is defined by a so-called PublishedDataSet, which represents a collection of variables and event sources from the information model of an OPC UA server. The PublishedDataSet can be flexibly configured and its description can be looked up in the server to interpret the semantics of the published information.

The OPC UA standard specification (section 14) defines the mapping of OPC UA PubSub onto existing Publish/Subscribe protocols, in particular MQTT (Message Queuing Telemetry Transport) and AMQP (Advanced Message Queuing Protocol). These protocols define a central broker for the message distribution and are commonly used in the public Internet. The standard also defines a custom UDP-based distribution protocol and the corresponding message layout—UADP—, relying on the multicast mechanisms provided by the IP standard. When using UADP, the subscriber registers for a multicast group identified by a specific IP multicast address.

This transport with binary encoded messages is well-suited in production environments for frequent transmission of small amounts of data. PubSub messages sent to this address are forwarded to all members of the group. Such a mapping delegates a large part of the publisher complexity to the existing network infrastructure (router, switches, etc.). Lastly, the standard also defines the transport of PubSub messages, with the same UADP layout, directly over the data link layer, namely Ethernet.

In that configuration, OPC UA PubSub can be integrated with TSN for real-time transport and Ethernet frames carrying an UADP payload are identified by a specific Ethertype (0xB62C). This mapping onto Ethernet TSN opens the possibility of very lightweight OPC UA PubSub implementations that assume a fixed PublishedDataSet and directly generate the desired network messages without the software and network exchange overhead found in OPC UA servers.

More details relating to the Pub/Sub principle in OPC UA are given below. The DataSet constitutes the payload of messages provided by the Publisher and consumed by the Subscriber(s). Publishers and Subscribers are loosely coupled and their primary relation is the shared understanding of the DataSets, the publish characteristics of messages that include these data, and the Message Oriented Middleware. PubSub messages are called NetworkMessages. They include:

header information (e.g. identification and security data), and
one or more DataSetMessages (the payload).

Each DataSetMessage is created from a DataSet. A component of a Publisher called DataSetWriter generates a continuous sequence of DataSetMessages. Syntax and semantics of DataSets are described by DataSetMetaData. The selection of information for a DataSet in the Publisher and the data acquisition parameters are called PublishedDataSet.

FIG. 1 illustrates these different roles and entities. A DataSet is created from an event or from a variable values sample. The configuration of this application-data collector is called PublishedDataSet. DataSet fields may represent: internal variables in the Publisher, events from the Publisher or collected by the Publisher, network data, or data from sub-devices. The structure and content of a DataSet is defined by the DataSetMetaData.

For publishing, a DataSet is encoded into a DataSetMessage which is possibly further combined with other DataSetMessages to form the payload of a NetworkMessage, as shown in FIG. 2. The DataSetWriter is configured for the encoding and transport of a DataSetMessage that contains the DataSet data. The configuration of DataSets and the way the data is obtained for publishing can be configured using the PubSub configuration model defined in the OPC UA PubSub standard specification.

The different layers in the construction of a NetworkMessage, including the DataSetMessage field, DataSetMessage, NetworkMessage and Transport Protocol are shown in the FIG. 3.

The DataSetMessage field can be defined as the representation of a particular DataSet field in a DataSetMessage. A DataSet field contains an actual value with additional information associated with that value such as a status and a timestamp. The DataSetMessage is generated from a DataSet and consists of a header and the encoded fields of the DataSet. Depending on configuration, the DataSetMessage header may contain additional information, such as:
- an identifier DataSetWriterId that identifies the DataSetWriter and indirectly the PublishedDataSet,
- a sequence number,
- a timestamp,
- a version ID,
- a "Keep alive" status.

The DataSetMetaData, as data contract, defines the fields contained in the DataSetMessage. The header settings for DataSetMessage and NetworkMessage define the communication contract between Publisher and Subscriber. The NetworkMessage is a container for DataSetMessages that includes a header conveying information common to the DataSetMessages:
- PublisherId: identifies the Publisher.
- Security data: only available for encodings that support message security.

The relevant information is specified in the message mapping.
- Promoted fields: selected fields out of the DataSet also sent in the header.
- Payload: one or more DataSetMessages.

The payload, consisting of the DataSetMessages can be encrypted in accordance with the configured message security. Individual fields of a DataSetMessage can be "promoted" to "escape" encryption and therefore be used for filtering and forwarding. The configuration of promoted fields depends on the NetworkMessage format and the used protocol. In any case, the NetworkMessage header is not encrypted to enable filtering and forwarding.

Now regarding the entities involved in this message exchanges, the Publisher is the PubSub entity that sends NetworkMessages (as shown in FIG. 2). It is an arbitrary entity and not necessarily a specific network node (e.g. with a specific IP or MAC address) or application. A Publisher may consist of one or more network nodes sending messages, typically.

A single Publisher may support multiple PublishedDataSets and multiple DataSetWriters. A DataSetWriter is a logical component of a Publisher. For the message sending, the creation of a message starts with the Collection of data (DataSet) to be published, according to a PublishedDataSet, producing the individual fields of a DataSet.

The DataSetWriter then creates a DataSetMessage from the DataSet. DataSetMessages from DataSetWriters belonging to the same WriterGroup can be inserted into a single NetworkMessage. The format and encoding of the DataSetMessages are fixed by some configuration parameters (not defined here).

The NetworkMessage is created from the DataSetMessage, the DataSetWriterId, the DataSetClassId, the Configuration Version obtained from the DataSetMetaData, together with the PublisherId defined on the PubSubConnection. The structure of a message is protocol specific.

NetworkMessages can be sent cyclicly, based on a PublishingInterval associated with a WriterGroup, and at a given offset, the PublishingOffset, from the beginning of each PublishingInterval.

The Subscriber is configured and/or uses discovery mechanisms to determine for which DataSetMessages and on which Message Oriented Middleware to subscribe. Unencrypted data in the NetworkMessage header is used by the Subscriber to identify and filter the relevant Publishers, DataSetMessages, DataSetClasses.

Once a DataSetMessage is determined as relevant, it is forwarded to the corresponding DataSetReader for decoding into a DataSet. The resulting DataSet is then further processed or dispatched within the Subscriber.

The Subscriber registers to distribution group supported by message-oriented middleware by establishing a connection, e.g. by participating to a UDP multicast group or an Ethernet multicast group.

The Subscriber dispatches the DataSetMessages of interest in the relevant Networkmessages to each DataSetReader that decodes them into DataSets using information provided in the DataSetMetaData.

FIG. 4 summarizes the relationship between PubSub components and their role in the creation of the different messages encoding stages. Relatively to the PubSub message mapping, a description below can be given as an example in the context of the UADP encoding of the messages that may be transported over UDP/IP or Ethernet. The UADP message mapping defines different optional header fields, field settings and different message types and data encodings.

The general UADP NetworkMessage layout is shown in FIG. 5. The different headers and fields are present, or not, depending on the Pub Sub communication configuration parameters. When using security, the payload and the Padding field are encrypted, and the whole NetworkMessage is signed if signing and encryption are configured as active. The NetworkMessage is signed only if only the signing is active.

FIG. 6 illustrates furthermore the generic format of the NetworkMessage's payload and payload header. Here again, headers and fields may be present or ignored depending on the DataSetMessage layout configuration.

Two transport protocols are specified for the transport of the NetworkMessages: OPC UA UDP and OPC UA Ethernet. In the following detailed description, OPC UA Ethernet only is described. The UADP NetworkMessage is transported as the payload of a VLAN-tagged Ethernet II frame of a maximum size of 1522 bytes. The IEEE registered OPC UA Ethertype for UADP communications is 0xB62C.

In the case of a transport over TSN, the NetworkMessages created by a Writergroup are sent over a TSN Stream, which can be identified by a Stream identification function specified in IEEE 802.1CB. Typical identification functions use the destination or source MAC address in combination with the VLAN-ID of the Ethernet frames encapsulating the NetworkMessages.

The mapping of PubSub level timing parameters (PublishingInterval and PublishingOffset) onto TSN timing parameters is mainly done by using the scheduling scheme offered by IEEE 802.1Qbv that permits to define transmission cycles as well as transmission times within these cycles, i.e. transmission offsets.

The NetworkMessage format for periodic communications with fixed layout data is described below. The UADP header formats of NetworkMessages and DataSetMessages are designed to be flexible and to support different use cases by enabling or disabling individual fields within the headers.

As a consequence, the number of possible header field combinations increases the complexity of their implementations. Conversely, some application domain with specific use cases can rely on configurations where header layouts include a reasonable set of header options to provide a compromise between flexibility, interoperability and support for different use cases.

Annex C of OPC UA Part 14 Annex C illustrates one of these use cases: the use of PubSub in cyclic exchange of real-time data. In this configuration, the layout of the data transferred upon every PublishingInterval is fixed and known from the Publishers and the Subscribers by configuration. The optimization can be even pushed further when the size of the DataSetMessages is constant.

The following conditions are then assumed:
  Each NetworkMessage contains the same number of DataSetMessages,
  The sequence of the DataSetMessages within a NetworkMessage is identical over every PublishingInterval,
  The layout of the fields within every DataSetMessage is identical over every PublishingInterval.

PublisherId and WriterGroupId identify the WriterGroup. The NetworkMessageNumber is used for WriterGroups that send their DataSets in several NetworkMessages. The Group Version allows the Subscriber to verify the expected layout of the DataSetMessages and their DataSet fields.

The header layout shown in FIG. 7 illustrates this use case when no security is implemented. When security (e.g. signing only) is implemented, the header layout includes the additional Security Header and Signature as shown in FIG. 8a. The DataSetMessage Header is reduced to the fields shown on FIG. 8b.

Messages layout examples are given hereafter. A first example is a fixed message layout without security. This configuration ensures that every NetworkMessage has constant headers and DataSet fields layout. Encoding and decoding of the message is simplified due to the constant offset of all fields. The Payload Header is omitted, the information it normally contains being derived by the Subscriber from the DataSetMetaData, DataSetWriter and WriterGroup settings. This configuration supposes a constant size for each DataSetMessage which can be guaranteed by configuration.

A proper configuration also guarantees that the number of DataSetMessages and their sequence within the NetworkMessage remains identical over all sent NetworkMessage. These properties are illustrated in FIG. 9.

A second example is a fixed message layout with security. The same configuration can be extended with security and leads to the compacted NetworkMessage format shown in FIG. 10.

Problem to be addressed:

OPC UA specifies then a very flexible scheme for the exchange of information between entities of complex systems, able to support a wide variety of application domains. This flexibility is reflected in the communication protocols that support these exchanges.

This flexibility comes at the cost of a potentially expansive overhead as illustrated by the base NetworkMessage format shown in FIG. 5. FIG. 19 shows a table that sums up the overhead induced by the different headers possibly found in a Pub Sub NetworkMessage without security.

For (N+1) DataSetWriters, this layout could lead to a maximum message length of:

21+11+[1+(N+1)×2]+10+PF+(N+1)×2+PL bytes.

Considering that no fields are promoted (not replicated in the non-encrypted part of the NetworkMessage), this gives a potential overhead of 47+4N bytes.

When transmitting cyclic data using the compacted UADP layout described above, the overhead is then reduced as summarized by the remaining white-background rows shown in FIG. 20.

Whatever the number of DataSetWriters is, the compacted layout, without security, could lead to a maximum message length of:

4+11+PL bytes, giving a potential overhead of 15 bytes.

Although the compacted UADP layout brings a substantial reduction of the PubSub overhead, the latter has still to be considered in its application environment, and in particular, the one of high-speed Ethernet TSN-based control, where the payload is often limited to around a hundred bytes.

In such a configuration, the minimum MAC layer Ethernet overhead, constituted of the:
  MAC destination address (6 bytes),
  MAC source address (6 bytes),
  VLAN-Tag (4 bytes),
  Ethertype (2 bytes),
adds another 18 bytes to the OPC UA message.

SUMMARY OF INVENTION

The present invention aims to improve the situation. To that end, the invention aims at a method for transmitting messages in a network having a communication mode involving publisher and subscriber devices over the network, the method comprising:
  an extraction of payloads of received messages, and a concatenation of said payloads within a same combined message,
  addition of a header to said combined message, said header comprising a single identifier of a publisher device, said publisher identifier being predetermined so as to intend the combined message to at least one chosen subscriber device.

An example of such an implementation is illustrated in FIG. 14 commented below, showing in particular the structure of the aforesaid combined message (having one header but a multiplicity of concatenated payloads coming from respective devices). This implementation makes it possible, inter alia, to reduce the overhead of an usual controller device.

Typically, in an embodiment, the aforesaid chosen subscriber device can be that controller device. The controller device controls devices in the network, which emitted the aforesaid received messages.

Especially, one device among these network devices can be selected to implement the method, on the basis of a criterion relative to the controller device and/or the emitting devices. More particularly, the method as presented above can be implemented by one of these emitting devices, or by one device connected to these emitting devices, and related to their controller device.

Typically, the aforesaid criterion can comprise at least a current topology of the network (to be taken into account so as to designate an optimum intermediate device between the emitting devices on the one hand and their controller device on the other hand, to perform the method above).

In an embodiment, the received messages have a header with a same publisher identifier (PublisherId=k on FIG. 14), whereas the received messages are emitted by a plurality of distinct publisher devices. The device performing the method can then identify these messages and gather them in one single combined message as shown in FIG. 14.

Each received message can include an identifier related to a device emitting said received message (which can be another identifier than the usual PublisherId, and for example the so-called "WriterGroupId" (=1, 2, 3 . . . in FIG. 14) which can define an order of reception of these messages). Besides, this emitter identifier defines in that embodiment an order of the payload of the received message in the aforesaid concatenation of payloads. These identifiers are already known from the standard specification "Open Platform Communications Unified Architecture".

More generally, in an embodiment, the network, through which the devices involved in the method are connected, is operated according to a standard of the type "Open Platform Communications Unified Architecture", and the aforesaid single identifier of a publisher device is a PublisherID identifier.

More particularly, the network can be further operated according to a standard of the type "Time Sensitive Networking".

Typically as presented above, the emitter identifier can be of a type of a WriterGroupID defining a timing of PublishingOffset and thereby an order of the payload of the received message in said concatenation of payloads.

Moreover, as shown in FIG. 14, the concatenated payloads can be extracted from messages received with a same predetermined cycle duration. Typically, in the embodiment shown in FIG. 15, this cycle duration can correspond to the PublishingInterval of the multiplexer device.

The present invention aims also at a network device selected to act as a multiplexer device and configured to implement the method as presented above. This device can be selected according to a criterion such as the current topology (for example its centrality in the network relatively to the other devices), and/or also, as presented below, according to respective specific functionalities of the devices.

The present invention aims also at a system comprising network devices emitting messages, and a multiplexer device to receive said messages and being configured to implement the method as presented above.

The present invention aims also at a controller device of such a system, and being configured:
to receive the combined message with the predetermined publisher identifier, and
to interpret the concatenation of payloads.

The present invention aims also at a computer program comprising instructions causing a network device to implement the method as presented above, when such instructions are executed by a processor of that network device. It aims also at a non-transitory computer storage medium storing such instructions.

Since the reception of a signal comprising a combined message structure as presented above, at a device of the network (typically a controller device for example), causes this device to interpret in a specific way that signal, the present invention aims also at such a signal. This signal comprises typically data of a message published in a network having a communication mode involving publisher devices and subscriber devices of the network, wherein the signal comprises:
data of a header including a single identifier of publisher device, and
data of a plurality of concatenated payloads initiated by respective devices of the network.

More details and advantages of possible embodiments of the invention will be presented below with reference to the appended drawings.

BRIEF DESCRIPTION OF DRAWINGS

FIG. 1 shows a classic Publish/Subscribe scheme.
FIG. 2 shows DataSets and DataSetMessages.
FIG. 3 shows PubSub message layers and encapsulation.
FIG. 4 shows PubSub entities and exchanged messages.
FIG. 5 shows the general UADP NetworkMessage format.
FIG. 6 shows NetworkMessage payload detail and DataSetMessage header format.
FIG. 7 shows a compacted NetworkMessage format for cyclic PubSub communications, without security.
FIG. 8*a* shows a compacted NetworkMessage format for cyclic PubSub communications, with signing only.
FIG. 8*b* shows a compacted NetworkMessage format for cyclic PubSub communications, with signing only.
FIG. 11 illustrates network topologies for industrial control and the use of a particular topology (lower part of FIG. 11) to implement the invention according to an example of embodiment.
FIG. 12 shows independent NetworkMessages towards a controller device PLC according to the prior art.
FIG. 13 shows a combined NetworkMessage according to the invention.
FIG. 19 shows a table that sums up an overhead induced by different headers possibly found in a PubSub NetworkMessage without security.
FIG. 20 shows a table that sums up an overhead induced by different headers possibly found in a PubSub NetworkMessage without security when a cyclic data is transmitted using a compacted UADP layout.

DESCRIPTION OF EMBODIMENTS

Figure 9:
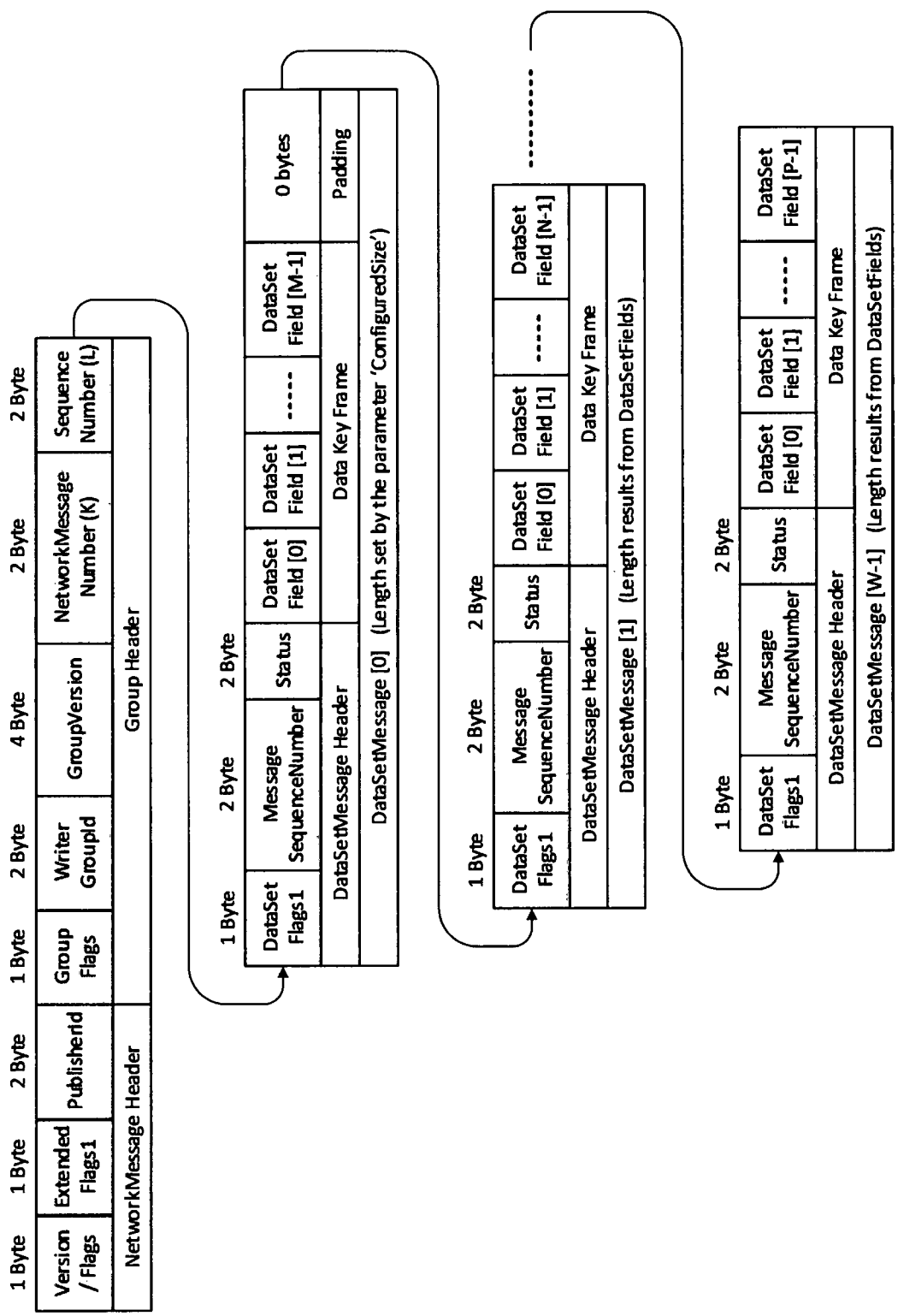
FIG. 9 shows a fixed compacted message layout without security.
Figure 10:
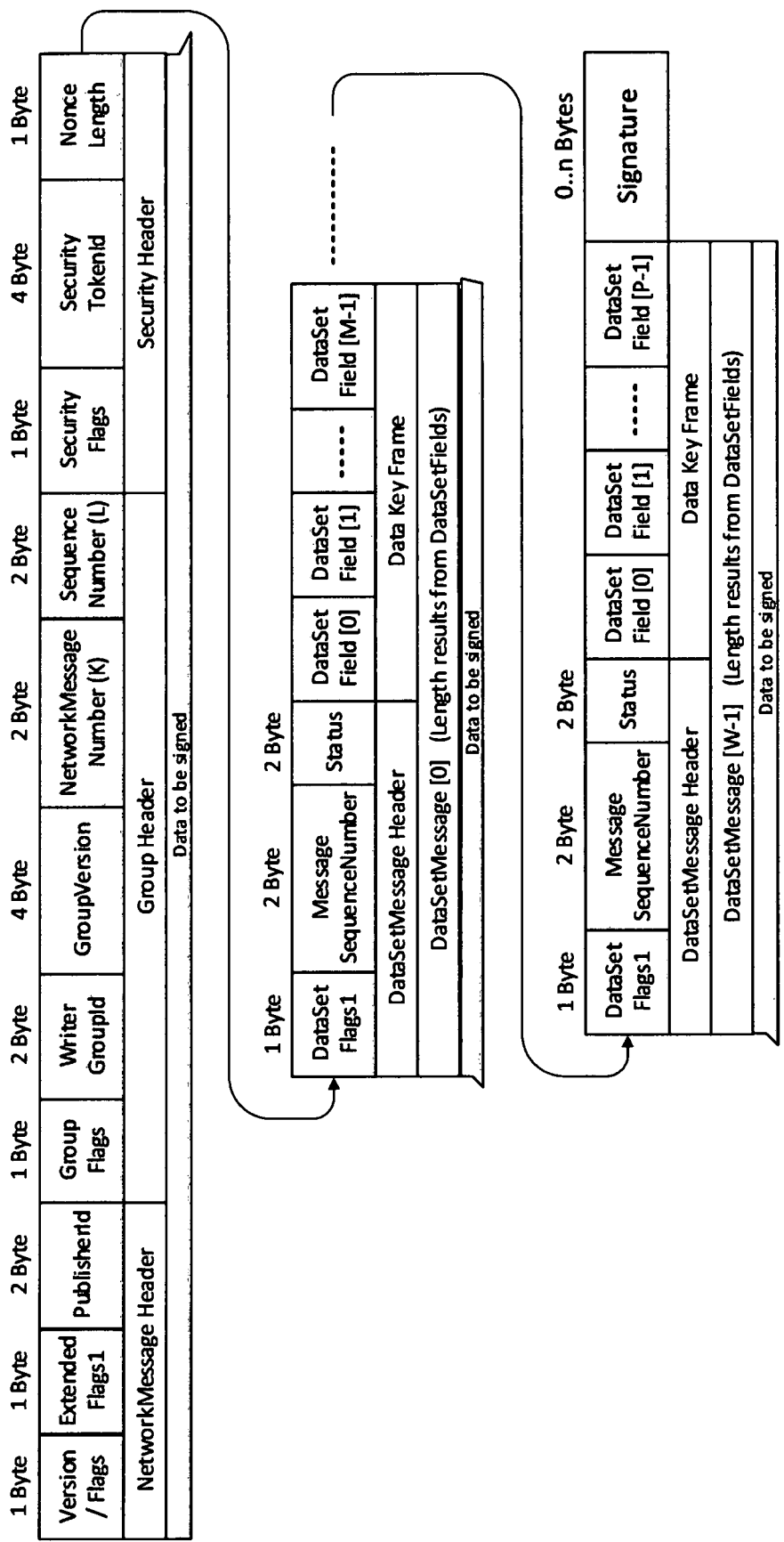
FIG. 10 shows fixed compacted message layout with security (signing only).

The invention proposes the reduction of the overhead in PubSub communications by combining the independent NetworkMessages sent by a set of devices (typically sensors and/or actuators as communicating devices in a network) into a single NetworkMessage. As presented below a multiplexer device (reference mux of FIG. 11—lower part) can implement to that end the following:
use an adapted configuration of the PubSub publishing functions of the devices, implement a PubSub multiplexing function, the multiplexing possibly depending inter alia on location in the network topology, implement a NetworkMessage scheduling function.

This implementation allows to combine a number of NetworkMessages initially generated by a set of devices into a single NetworkMessage to be received by the subscriber. In an embodiment, the subscriber can be a single entity and preferably a controller device such as a so-called "Programmable Logic Controller" (PLC hereafter) which controls locally a set of devices (sensors and/or actuators) in the network topology (over the PLC link as shown in FIG. 11).

FIG. 11 shows a typical embodiment of control topologies that can be found in industrial production lines or within a machine, where a PLC (Programmable Logic Controller) controls a set of devices (sensors and/or actuators). Information and commands between the controller and the devices are exchanged cyclically and each device usually handles short information data (e.g. 16-bit command, 8-bit counter value, etc.).

In prior art solutions, when using OPC UA PubSub communications, a simple configuration can be to have each device including a Publisher and/or a Subscriber. In such a mapping, the Publisher includes a WriterGroup that produces the NetworkMessages containing the DataSetMessages to be sent by the device. Each device then transmits its own independent NetworkMessages producing a train of messages on the PLC link as shown in FIG. 12.

The number of devices that can be addressed within each cycle is a function of:

the duration of the cycle, the length of the NetworkMessages.

The portion of link capacity occupied by the total amount of the NetworkMessages' overhead, i.e. Ethernet and PubSub overheads, has two dual effects:

a limitation of the control cycle duration for given number of devices, a limitation of the number of devices controlled within one cycle.

When implementing OPC UA PubSub over an Ethernet TSN network, the overhead due to the Ethernet frame header is not compressible: both MAC addresses, the VLAN-Tag and the Ethertype being required for the handling of the corresponding stream by the TSN bridges. Thus, the sole reduction of PubSub overhead permits to overcome the prior art limitations mentioned above.

As shown indeed by the comparison of the FIGS. 12 and 13, a single network message:

gathering the payloads of different devices, and having a single header identifying one single publisher, and a single Ethernet header in the example of FIG. 13, according to the invention and as shown in FIG. 13, makes it possible to limit the overhead mentioned above.

On the other side of the readers of such a single network message, the ReaderGroup of the PLC's Subscriber entity is configured to properly interpret and demultiplex the DataSetMessages received in such a single NetworkMessage, as presented below in the present description.

Regarding the devices publisher configuration, the configuration related to the NetworkMessage header is such that all devices for which NetworkMessages have to be combined are considered as forming a distributed Publisher and are configured with the same PublisherId, in an embodiment.

The configuration related to the Group Header is such that each device sends their NetworkMessages with a particular WriterGroupId, which identifies the device within the Publisher.

The NetworkMessageNumber can be ignored under the constraint that a given Writer Group sends only one NetworkMessage per PublishingInterval or cycle. In case a Writer Group sends several NetworkMessages per PublishingInterval, they are sent back to back with consistent NetworkMessageNumbers.

The SequenceNumber is monotically increased upon transmission of each NetworkMessage by the WriterGroup.

The configuration related to the NetworkMessages payload is such that the layout of the payload is kept as described in OPC UA Part 14 Annex C: a pre-determined series of fixed-format DataSetMessages.

The individual DataSet fields within a DataSetMessage are kept unchanged.

One of the DataSet fields in each DataSetMessages can be reserved for the insertion of an integrity check code computed over the whole DataSetMessage. This integrity code (e.g. a CRC-16) can be then used by the DataSetReader in the destination subscriber entities to check the validity of the DataSetMessage.

The multiplexing function is now described below.

The PubSub multiplexer can receive Ethernet-encapsulated NetworkMessages over its network inputs and sends a combined Ethernet-encapsulated NetworkMessage over its network output. The PubSub multiplexer has at least two inputs and a single output, as shown in the lower part of FIG. 11.

When integrated in a device, at least one input of the multiplexer receives raw NetworkMessages, i.e. not encapsulated in an Ethernet frame, generated by the application co-located with the multiplexer.

Figure 14:
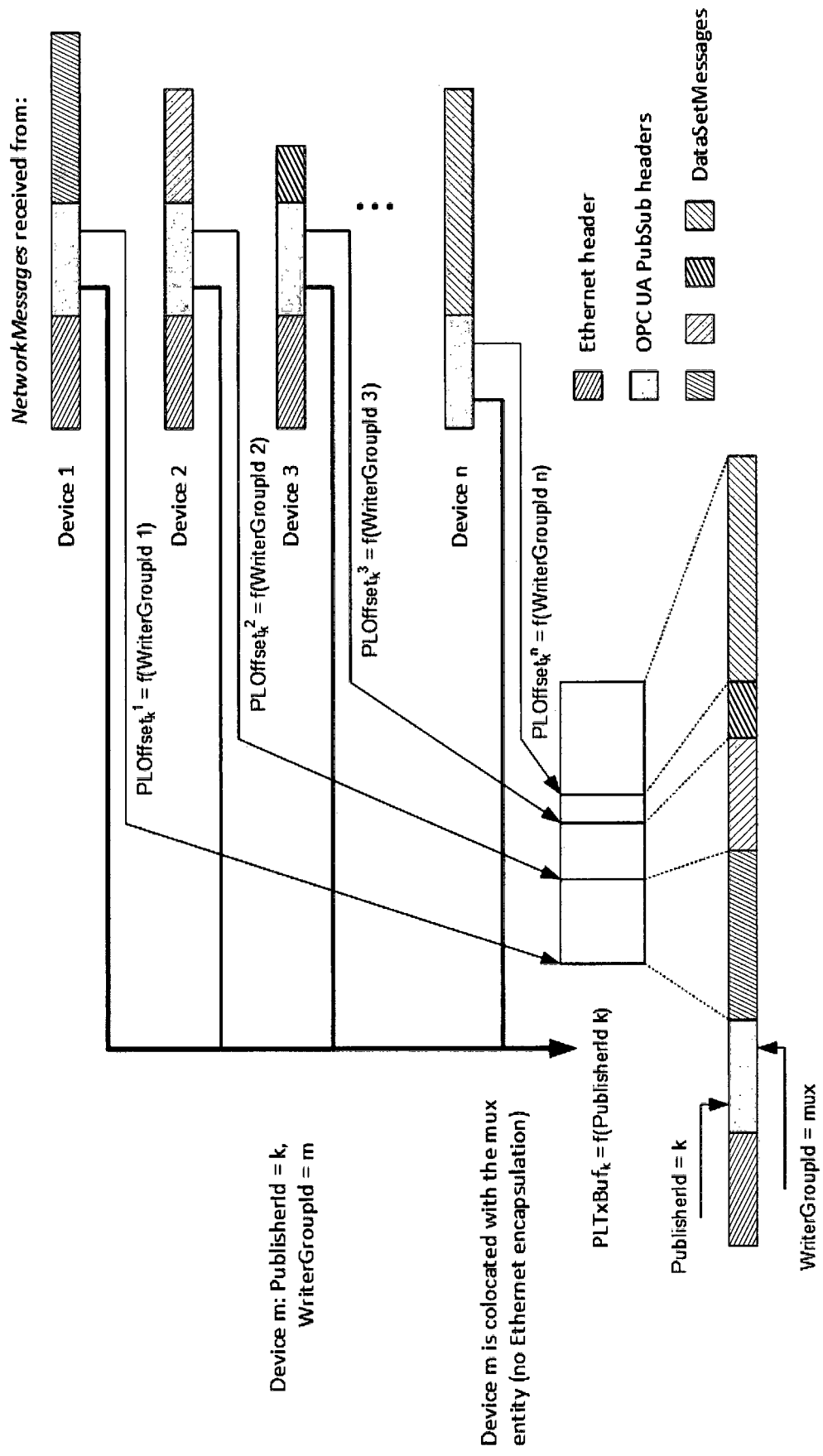
FIG. 14 illustrates a multiplexer operation.

As shown in FIG. 14, the multiplexer relies on several data structure and variables to perform the NetworkMessages combination:

A Payload Transmit buffer (PLTxBuf) associated with each PublisherId, i.e. with each Publisher from which the received NetworkMessages are to be combined, A Payload offset (PLOffset) associated with each WriterGroup included in the Publisher from which the received NetworkMessages are to be combined.

$PLTxBuf_k$ is associated with Publisher k.

$PLOffset_k^i$ is associated with WriterGroup i (WriterGroupId=i), included in Publisher k (PublisherId=k). $PLOffset_k^i$ indicates the offset, with reference to the base of $PLTxBuf_k$ where the payload (DataSetMessages) of the NetworkMessage received with PublisherId=k and WriterGroupId=i is stored.

The NetworkMessages generated by the multiplexer includes the following information:

In NetworkMessage Header: PublisherId=k

In Group Header:

WriterGroupId=mux, where mux is a value associated with the multiplexer

Group Version=value associated with the multiplexer entity, fixed by configuration NetworkMessageNumber=1: assumption is made that no more than one Networkmessage per PublishingInterval is generated from the NetworkMessages' combination SequenceNumber=value incremented by the NetworkMessage generation function of the multiplexer each time a new In NetworkMessage is generated.

The payload layout in the combined NetworkMessage, and in particular the order of the DataSetMessages, is defined by the multiplexer configuration.

A preferred configuration consists in keeping the DataSetMessages, associated with a particular WriterGroup, grouped as they initially are in the incoming NetworkMessages in order to avoid extra reordering by the multiplexer.

Figure 15:
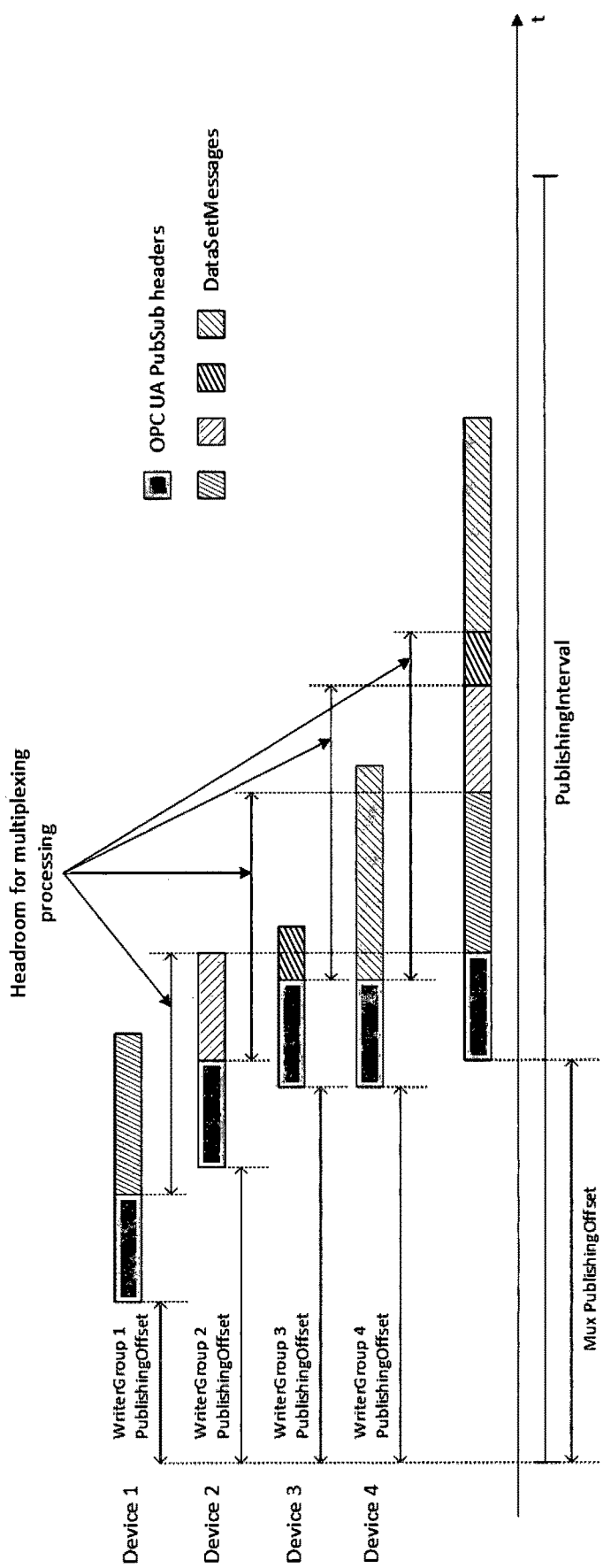
FIG. 15 illustrates a NetworkMessages scheduling for a minimum of multiplexing latency, in an example of embodiment.

The NetworkMessages scheduling is shown in FIG. 15. Typically, it is possible to take advantage of a PublishingInterval common to the devices and the multiplexer to reduce the latency of the NetworkMessages combination operation. This can be achieved by configuring an appropriate PublishingOffset for each WriterGroup included in the devices. It is reminded indeed that the mapping of PubSub level timing parameters (PublishingInterval and PublishingOffset) onto TSN timing parameters is mainly done by using the scheduling scheme offered by IEEE 802.1Qbv that permits to define transmission cycles as well as transmission times within these cycles, i.e. transmission offsets. The cyclic timing of transmissions can be defined thus by such offset standard constraint.

As shown in FIG. 15 (the illustration not taking into account possible latencies caused by network or internal propagation delays), the device WriterGroups' PublishingOffsets can be configured so that the minimum headroom required by the multiplexer to perform the NetworkMessages combination is provided and thus minimum multiplexing latency is guaranteed.

Figure 16:
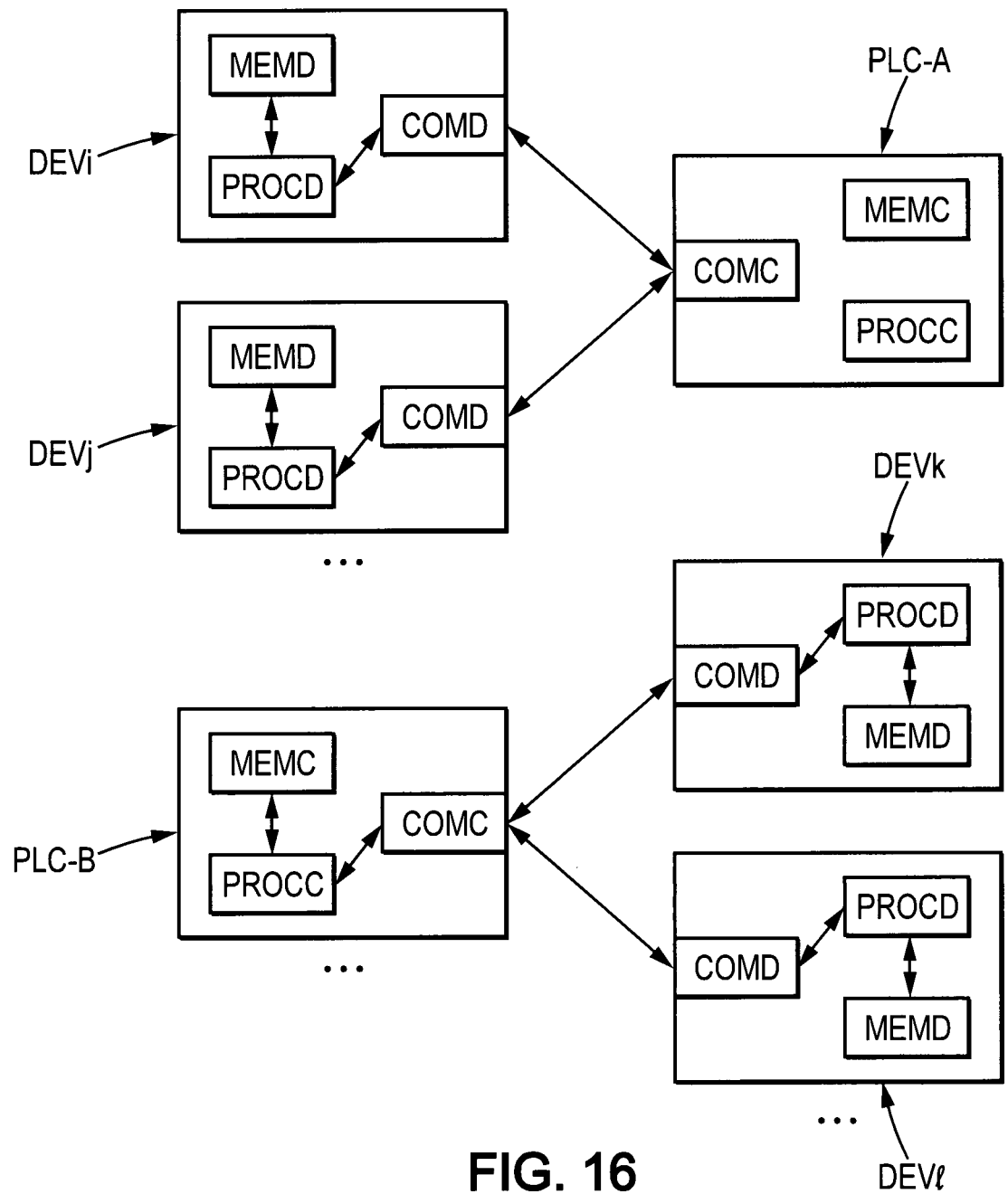
FIG. 16 shows schematically a system with several devices and, in this example, several controllers in a network.

Referring now to FIG. 16, a plurality of devices DEVi, DEVj, . . . , can be linked to a controller PLC-A, such that PLC-A is subscriber when devices DEVi, DEVj, . . . are publishers. Other controllers (PLC-B, etc.) are possible in the network, and can be linked to other publisher devices DEVk, DEVl, etc. Of course, one or several devices among devices DEVi, DEVj, . . . , can be publishers for the second controller PLC-B, and reversely one or several devices among DEVk, DEVl, etc. can be publishers for controller PLC-A.

At least one node of the network can act as a multiplexer to process PubSub messages transmitted by devices DEVi, DEVj, etc. Typically (but not mandatorily), the multiplexer can be a device among DEVi, DEVj, etc., chosen according to the topology of the network, and/or according to the respective functions of the nodes, etc. Optionally, several multiplexers can be chosen to process respectively the messages sent by devices DEVi, . . . , DEVm, on the one hand, and the messages sent by devices DEVm+1, . . . , DEVj, on the other hand. Here, a third multiplexer can process the PubSub messages received from both groups of devices DEVi, . . . , DEVm, and DEVm+1, . . . , DEVj, to combine them for the common controller PLC-A.

Therefore, at least some of the nodes of the network can be programmed to have a multiplexing function so as to combine different PubSub messages into a single one, adding different payloads (DataSetMessages) but keeping a single header as shown in FIGS. 13 and 14. Typically, in the example of FIG. 14, the node entity multiplexing the messages is device m, programmed with such a multiplexing function. The other devices 1, 2, . . . , n, can be programmed to publish their messages with the same publisher identifier PublisherID=k, which can be equal or different from m. When device m receives the published messages under PublisherID=k, device m is programmed to combine them and more particularly to concatenate their payloads in an order depending on the WriterGroupID indicated in each message header, so as to respect their respective PublishingOffset, as explained above with reference to FIG. 15. In another embodiment, the publisher devices 1, 2, . . . , n of FIG. 14 can be programmed to publish their message with their own PublisherID (1, 2, . . . , n) and the multiplexing device m can be programmed to identify these identifiers PublisherID (1, 2, . . . , n) so as to combine the messages received from the corresponding devices 1, 2, . . . , n.

Referring again to FIG. 16, each device can comprise typically a communication interface COMD, connected to a processor PROCD cooperating with a memory MEMD storing data such as their identifiers of publisher PublisherID, of WriterGroup, etc. and instructions of a computer program to build and send NetworkMessages with a payload and a header comprising inter alia such identifiers. In some embodiment where their PublisherID is to be replaced with the multiplexing device PublisherIDI, the computer program can apply such a function. More particularly, if one of these devices is designated to act as a multiplexing device (according to the topology of the network for example), the computer program (stored in the memory MEMD of this device) can be enhanced with such a multiplexing function.

Moreover, each controller PLC can comprise also a communication interface COMC, connected to a processor PROCC cooperating with a memory MEMC storing inter alia instructions of a computer program to interpret the combined message (and its combined payloads) published by the multiplexer device.

Figure 17:
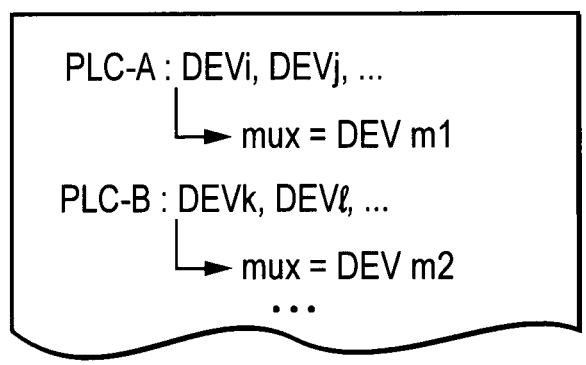
FIG. 17 shows a correspondence table built according to the topology of the network and/or to functionalities of the devices in the network, and defining a possible multiplexer device for each group of devices linked to a specific controller defined as a subscriber to messages published by devices of that group.

Now referring to FIG. 17, a correspondence table can be defined (for example by a network scheduler) according to the network topology and/or the devices functions in the network, inter alia. The table can thus define, for each controller PLC-A; PLC-B; etc.:
  the devices (respectively DEVi, DEVj, etc.; DEVk, DEVl, etc.) which can be publisher devices for this controller, and the multiplexer device (DEVm1; DEVm2) to combine the messages published by such publisher devices.

The overhead of the controllers PLC-A, PLC-B, etc. to receive several messages and interpret their headers, can be thus deported on the multiplexers DEVm1, DEVm2, so as to process only the payloads received in a single message at the controllers' side.

Moreover, each controller can process more messages, and then control more devices within one cycle, or the control cycles can be shorter for a same number of data to transmit (or finally for a same number of devices to control).

Figure 18:
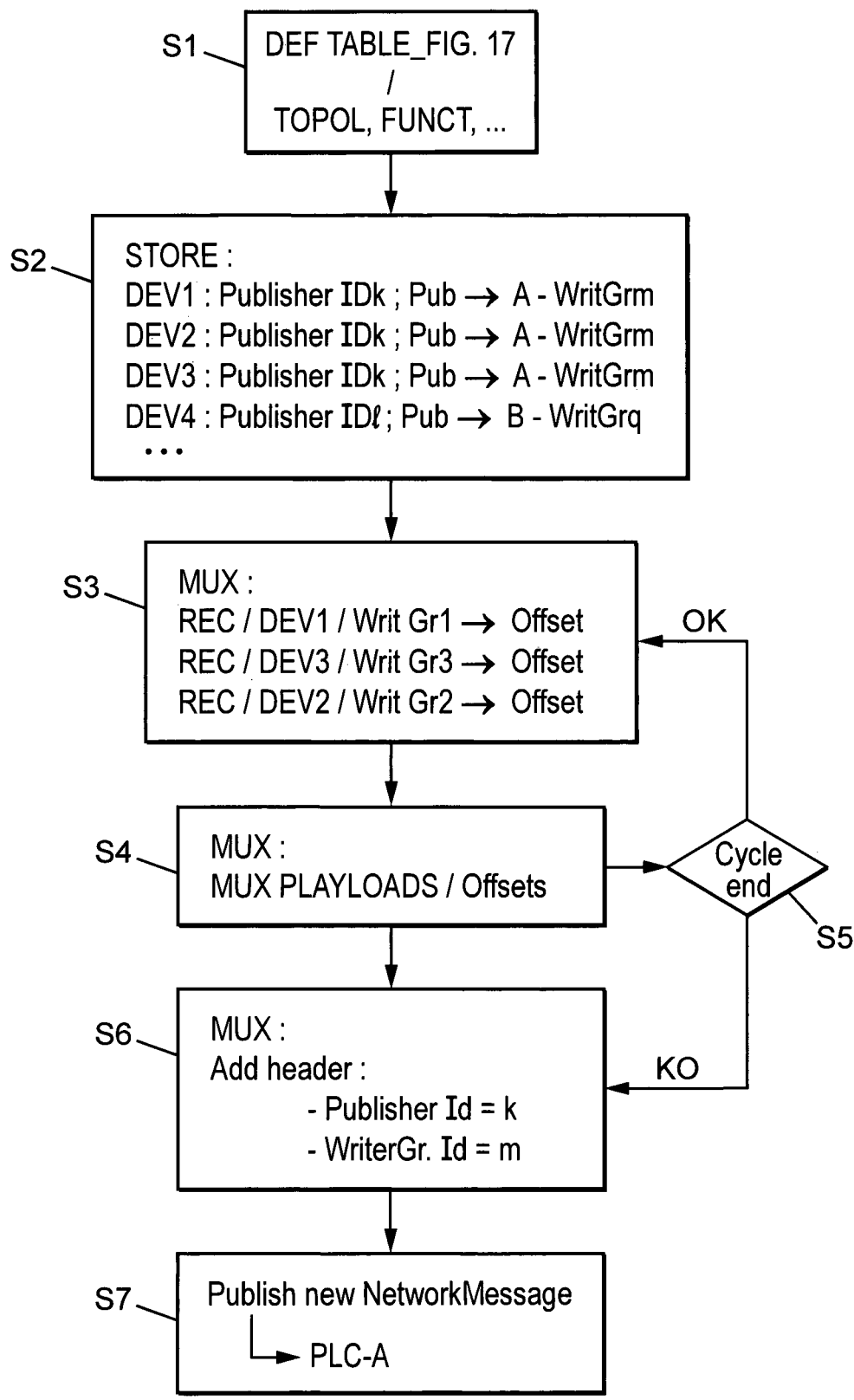
FIG. 18 shows possible steps of a method according to the invention (possibly representing a general algorithm of a computer programme according to the invention).

Referring now to FIG. 18, a first step S1 can consist thus on defining (at a network scheduler's side for example) the correspondence table as presented previously with reference to FIG. 17. The instructions of this table can be sent at step S2 at least to each multiplexer device which stores at least, in an embodiment:
  the PublisherID=k of the group to which the multiplexer device m and the corresponding controller PLC-A are linked, and
  the WriterGroupID=m that the header of any future combined NetworkMessage shall include.

At this step S2, the PublisherID=k can be sent also to devices DEV1, DEV2, etc., so as to use it when a message is to publish with PLC-A as subscriber. The controller PLC-A can store also the PublisherID=k so as to consider a combined message when received with such a PublisherID.

In this embodiment, in step S3, the multiplexer device MUX receives the messages published by devices DEV1, DEV2, DEV3, etc. with the PublisherID=k (making the multiplexer device to consider them), and their own WriterGroupID=1, 3, 2, etc. Based on these respective identifiers WriterGroupID=1, 3, 2, the multiplexer device is configured to manage the order of the payloads of these messages, with corresponding offsets in step S4 and possibly to rearrange that order (the order of payloads becoming for example #1, then #2, then #3).

The steps S3 and S4 of receiving the messages from the group (PublisherID=k) and combining their payloads can be performed until one cycle ends in step S5. Preferably, the payloads are combined as soon as the messages are received from devices DEV1, DEV2 and DEV3 and there is no need to wait for the end of the cycle for implementing the payloads combination. The duration of that cycle can be defined by the PublishingInterval of the multiplexer device, as shown in FIG. 15. The PublishingOffset defines the time, relative to the beginning of the cycle, at which the Network-Message can be transmitted. To that end, the PublishingInterval and the PublishingOffset can be other data to be stored in step S2 by the multiplexer device.

Before the end of the cycle (arrow KO from test S5), the multiplexer can transmit the concatenated NetworkMessage comprising the successive payloads of the messages successively received from devices DEV1, DEV2, DEV3, arranged in that order, and to which the multiplexer adds at least:

the PublisherID of the group (=k), so that the controller PLC-A will consider the message resulting from the combination of these payloads arranged in that order, its own WriterGroupID (=m), so that any other multiplexer or the controller, needing to arbitrate a priority among several combined messages, can use its offset given by WriterGroupID=m.

It is reminded indeed that this information WriterGroupID makes it possible indeed to manage the publishing Offset, in a general way, of PubSub messages.

Finally, in step S7, the multiplexer device publishes the new combined message with this header so as to be considered by the controller PLC-A as subscriber.

The arrow OK from test S5 corresponds to the situation when the current cycle is finished, and for beginning a new cycle, the multiplexer device waits for new messages to receive from devices DEV1, DEV2, DEV3, or possibly from other devices.

Therefore, it appears that the invention makes use of different mechanisms specified in the IEEE 802.1 TSN and OPC UA Part 14 (PubSub) standards, and its implementation does not require any further standardization.

Since this optimization allows an improvement of the OPC UA Pub communications performance, the invention can advantageously be applied of course to OPC UA Pub-Sub-based control systems, providing thus high-performance (short control loop) OPC UA Pub Sub-based Factory Automation products. However, the same principle can be applied to other communication protocols using the same kind of information organisation.

The invention claimed is:

1. A method for transmitting Network messages in a network operated according to a standard of type "Open Platform Communications Unified Architecture," the network having a communication mode involving publisher and subscriber devices over the network, the method comprising:

receiving a plurality of Network messages emitted by a plurality of different publisher devices that share a common identifier of a publisher device (PublisherID) and have different writer group identifiers (WriterGroupID) than one another, wherein each writer group identifier WriterGroupID defines a timing of PublishingOffset related to a device emitting a corresponding one of said received Network messages, extracting payloads (DataSetMessages) of the received Network messages, concatenating said extracted payloads within a same combined Network message, wherein said writer group identifiers WriterGroupIDs, by virtue of defining said timings of PublishingOffsets, define an order of the payload of the received Network message in said concatenation of payloads, adding a header to said combined Network message, said header comprising a single identifier of a publisher device (PublishId=k), said single identifier of the publisher device being of type PublisherID and being predetermined so as to intend the combined Network message to at least one chosen subscriber device.

2. The method according to claim 1, wherein the at least one chosen subscriber device is a controller device of network devices emitting said received Network messages.

3. The method according to claim 2, wherein a device connected to the network is selected to implement the method, on a basis of a criterion relative to said controller device and/or said emitting devices.

4. The method according to claim 3, wherein said criterion comprises at least a current topology of the network.

5. The method according to claim 1, wherein the received Network messages have a header with a same publisher identifier, whereas the received Network messages are emitted by a plurality of distinct publisher devices.

6. The method according to claim 1, wherein the network is further operated according to a standard of type "Time Sensitive Networking".

7. The method according claim 1, wherein the concatenated payloads are extracted from messages received within a same predetermined cycle duration (PublishingInterval).

8. A network device selected to act as a multiplexer device, the network device comprising a computer processor and a memory, wherein the computer processor is configured to execute instructions in the memory to perform the method as claimed in claim 1.

9. A system comprising network devices emitting messages, and a multiplexer device to receive said messages and being configured to implement the method as claimed in claim 1.

10. A controller device of a system according to claim 9, configured to receive the combined Network message with the predetermined publisher identifier, and to interpret said concatenation of payloads.

11. A non-transitory computer readable medium storing a computer program comprising instructions causing a network device to implement the method as claimed in claim 1, when such instructions are executed by a processor (PROCC; PROCD) of said network device.

* * * * *